Jan. 18, 1938.    L. C. SHIPPY ET AL    2,105,704
METHOD OF MAKING HOLLOW BODIES
Filed Aug. 25, 1933

INVENTOR
LEO C. SHIPPY
WILMAR OSCAR GEBHART
BY
Spencer Hardman & Fehr
ATTORNEYS

Patented Jan. 18, 1938

2,105,704

UNITED STATES PATENT OFFICE 2,105,704

METHOD OF MAKING HOLLOW BODIES

Leo C. Shippy, Lockport, N. Y., and Wilmar Oscar Gebhart, Anderson, Ind., assignors, by mesne assignments, to General Motors Corporation, Detroit, Mich., a corporation of Delaware Application August 25, 1933, Serial No. 686,756

7 Claims. (Cl. 18—59)

This invention relates to the molding of hollow bodies, and more particularly to hollow bodies such as knobs or handles used on the end of a gear shift lever of automotive vehicles.

An object of the present invention is to provide a hollow body which will be strong and durable and will require but a minimum amount of "Bakelite" or artificial resinous compound in its production.

Another object of the present invention is to prevent the accumulation of cured "Bakelite" or other artificial resinous compound at the inner end of a threaded insert which is molded in the hollow knob to provide means for attaching the knob to an end of a lever. By preventing the accumulation of a substantial amount of "Bakelite" at the inner end of the threaded insert the wear and tear on taps used to clean out "Bakelite" from the insert is materially reduced. This is accomplished by first placing a threaded insert into a mold, and then arranging uncured "pills" or "preforms" of "Bakelite" or artificial resin above the insert in such a manner that a center void or air chamber is formed above the insert. All of the preforms are then subjected to a molding operation that will trap air in the air chamber so as to keep the plastic material from flowing toward the center of the chamber and away from the threaded portion of the insert.

Further objects and advantages of the present invention will be apparent from the following description, reference being had to the accompanying drawing, wherein a preferred embodiment of one form of the present invention is clearly shown.

Figure 1:
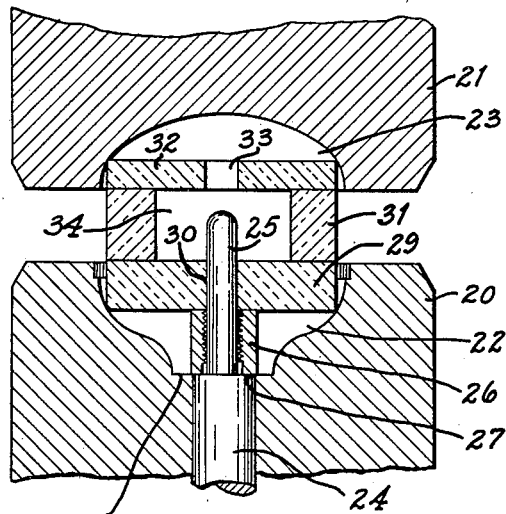
Fig. 1 is a longitudinal sectional view showing the initial stage of a molding press in a separated position and associated posts required to manufacture one of the improved knobs.
Figure 2:
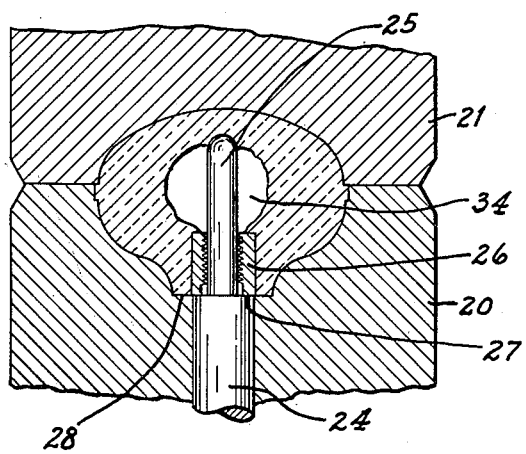
Fig. 2 is a view similar to Fig. 1 showing the molding press in a closed position.

Referring to the drawing, a lower die member 20 and an upper die member 21 are provided with recesses 22 and 23 respectively. The recess 22 is coaxial with respect to a knock-out pin 24 slidably supported by the die member 20. The pin 24 is provided with a reduced end 25, upon which is placed a short knurled sleeve or insert 26, having through internal threads, which is molded into the knob during the molding operation.

Describing the preferred method employed in carrying out this invention, the insert 26 is placed over the reduced end 25 so that one end thereof will rest on the shoulder 27 of the pin 24, said shoulder being flush with the bottom 28 of the recess 22 of the die member 20. A "pill" or "preform" 29 of uncured "Bakelite" and having an aperture 30 is placed over the end 25 and rests upon the metal insert 26. A ring 31 and a second disc 32 having an aperture 33 of uncured "Bakelite" is placed above the disc 29 in such a manner that an air chamber 34 is formed. The upper die member 21 is then placed over the mold material. The die members 20 and 21 are then operated at a temperature and pressure such as ordinarily used in molding operations. The die members are closed rapidly, the reduced end 25 of the pin 24 closing the aperture 33 of the disc 32 so that the air within the chamber 34 is trapped. By reason of the air being trapped within the chamber 34 the finished molded article will be hollow, as the trapped air within the chamber 34 prevents the plastic material from flowing toward the center of the chamber, thus preventing the accumulation of the plastic material from entering into the threaded portion of the insert 26, but allowing the "Bakelite" while in a plastic form to surround the knurled section of the insert and along the walls of the die members to form a shell of substantial uniform thickness throughout.

After the pressure and heat have been applied for a sufficient length of time, the die members are separated. On separation of the die members the compressed air within the chamber will cause the knob or molded body to loosen itself from the die member 20 so that the knob may be easily removed. The knock-out mechanism usually employed for removing the work has not been shown, it being understood that such mechanism is well known, and will be used when required.

It is obvious that the present invention materially reduces the cost of manufacture of hollow knobs of molded material. Not only is less molding material required, but the wear and tear of the taps that are used to clean out the "Bakelite" from the threaded portion of the inserts is materially reduced.

The term "Bakelite" is understood to include generally molding compounds which are cured under the application of pressure or heat and pressure.

While the form of embodiment of the present invention as herein disclosed, constitutes a preferred form, it is to be understood that other forms might be adopted, all coming within the scope of the claims which follow.

What is claimed is as follows:

1. The method of making hollow bodies, comprises the steps which include, arranging two disc preforms and one ring preform of uncured phenolic condensation material in a mold in a manner such as to form a central void, closing the mold quickly to trap the air in the void and then subjecting the preforms to heat and pressure within the mold to cause the material to flow along the walls of the mold and to keep the material away from the center of the body, and releasing the air from the body whereby the body is loosened from the mold.

2. The method of making hollow bodies, comprises the steps which include, arranging superimposed preforms of uncured moldable material upon each other in a manner such as to provide an air pocket, one of the preforms has an aperture to permit air between the preform and mold to be forced within the preforms, applying sufficient pressure to bring the mold together to trap in air between the preforms, heating the material while the air is trapped to keep the flow of material away from the center of the body, and then allowing the air to escape to loosen the body from the mold.

3. The method of making a hollow member, comprises the steps which include, placing a disc of uncured molding material around a central locating pin in the lower half of the mold, placing a ring of uncured molding material over the disc, placing a disc of uncured molding material over the ring and forming a central void, closing the upper half of the mold quickly to trap air in the void and then subjecting the preforms to heat and pressure to cause the molding material to flow along the walls of the mold members while the trapped air tends to keep the molding material from the center of the member, and then allowing the air to escape to free the body from the molds.

4. The method of making hollow knobs having a metallic sleeve, comprises the steps which include, placing a metal sleeve in the lower half of the mold, placing preforms of uncured molding material in the mold in a manner such as to form a central void, closing the upper mold quickly to urge the sleeve against the lower mold to trap the air in the void and subjecting the preforms to heat and pressure within the molds to cause the molding material to flow along the walls formed by the molds while the trapped air tends to keep the flow of molding material away from the interior of the sleeve, and then releasing the trapped air through the sleeve.

5. The method of making a hollow knob having a tubular insert comprises the steps which include, placing the insert in the lower half of the mold, placing a preform of uncured new molding compound above the insert, placing a second preform over the first preform, placing a third preform over the second preform forming a central void, closing the upper half of the mold quickly to urge the insert against the lower mold to trap the air in the void and then subjecting these articles within the mold cavities to heat and pressure to expand the air and cause the molding compound to flow along the walls of the cavities and contact with the outer circumference of the insert while the trapped air tends to keep the flow of Bakelite from entering the interior of the insert, and then releasing the trapped air to free the knob from the mold.

6. The method of making knobs provided with a void communicating with the exterior thereof comprising the steps which include, supporting a tubular member in a lower mold, placing preformed members of uncured molding material in a manner to provide a void above the tubular member, closing an upper mold quickly to force the tubular member against the lower mold to prevent escape of air through the sleeve and trap the air between the preformed members, subjecting the preforms to heat and pressure to expand the trapped air in the void and cause the preforms to become plastic and weld together to provide a continuous shell with the air compressed within the same, and then separating the molds allowing the air to escape through the sleeve and free the knob from the mold.

7. The method of making hollow bodies, comprising the steps which include, arranging superimposed preforms of uncured moldable material upon each other in a mold in a manner such as to provide an air pocket, one of the preforms having an opening allowing air to be forced between the preforms, applying sufficient pressure to bring the mold together and closing the opening before the molds are brought together to trap the air between the preforms, subjecting the preforms to heat and pressure to expand the trapped air within the pocket to keep the material away from the center of the body, and then separating the molds allowing the trapped air to escape and free the body from the mold.

LEO C. SHIPPY.
WILMAR OSCAR GEBHART.